(12) United States Patent
Bai et al.

(10) Patent No.: US 8,510,324 B2
(45) Date of Patent: Aug. 13, 2013

(54) EFFICIENT INFORMATION EXCHANGE BETWEEN ENCOUNTERING VEHICLES USING APPROXIMATE KNOWLEDGE VIA HASH FUNCTIONS

(75) Inventors: Fan Bai, Ann Arbor, MI (US); Bo Yu, Warren, MI (US); Donald K. Grimm, Utica, MI (US)

(73) Assignee: GM Global Technology Operations LLC, Detroit, MI (US)

(*) Notice: Subject to any disclaimer, the term of this patent is extended or adjusted under 35 U.S.C. 154(b) by 300 days.

(21) Appl. No.: 13/017,090

(22) Filed: Jan. 31, 2011

(65) Prior Publication Data

US 2012/0197875 A1    Aug. 2, 2012

(51) Int. Cl.
*G06F 17/00* (2006.01)
*G06F 17/30* (2006.01)
*G06F 7/00* (2006.01)
*G06F 19/00* (2011.01)
*H04N 7/18* (2006.01)

(52) U.S. Cl.
CPC . *G06F 17/30* (2013.01); *G06F 7/00* (2013.01)
USPC .......... 707/766; 707/612; 707/620; 707/758; 707/770; 348/148; 701/32.5; 701/32.9; 701/34.4

(58) Field of Classification Search
CPC . G06F 17/30; G06Q 30/0246; B60R 16/0315
USPC ............... 707/715–727, 740–747, 803–806, 707/612, 614, 620, 621, 758, 766, 769, 770; 701/425, 49–50, 117–121, 32.2–32.5, 32.7, 701/32.9, 34.4, 409–410, 422, 451–452; 340/990, 993, 995.12; 348/148

See application file for complete search history.

(56) References Cited

U.S. PATENT DOCUMENTS

| | | | |
|---|---|---|---|
| 5,668,897 A | * | 9/1997 | Stolfo ........................... 382/283 |
| 6,202,008 B1 | * | 3/2001 | Beckert et al. ................ 701/29.1 |
| 6,211,907 B1 | * | 4/2001 | Scaman et al. ................ 348/148 |

(Continued)

FOREIGN PATENT DOCUMENTS

| | | | |
|---|---|---|---|
| EP | 1251334 | * | 10/2002 |
| WO | WO 2006/031382 | * | 3/2006 |

OTHER PUBLICATIONS

Martin Böhm et al. "Data-Flow and Processing for mobile In-Vehicle Weather Information Services", 2009, IEEE pp. 1-5.*

(Continued)

*Primary Examiner* — Srirama Channavajjala

(57) ABSTRACT

A method is provided for efficiently transferring records related to places of interest between two communicating vehicles in a V2V system without initially having to transfer full text records. A determination is made as to whether information stored in a memory of the vehicle is redundant with the respect to the other vehicle. A query request is transmitted from a first vehicle to a second vehicle containing specifics as to what records the first vehicle is seeking. Data satisfying the query request represented by global unique index numbers is hashed to determine the similarity between the data of the two communicating vehicles. The similarity is used to determine whether a full filtered set of global unique index numbers should be transferred to the second vehicle for determining which records are not duplicate records. Thereafter, the second vehicle wirelessly transmits to the first vehicle the non-overlapping data that satisfies the query request.

20 Claims, 2 Drawing Sheets

(56) References Cited

U.S. PATENT DOCUMENTS

| | | | |
|---|---|---|---|
| 6,408,232 B1* | 6/2002 | Cannon et al. | 701/32.4 |
| 6,438,561 B1* | 8/2002 | Israni et al. | 455/457 |
| 6,711,563 B1* | 3/2004 | Koskas | 707/769 |
| 7,450,603 B2* | 11/2008 | Nix et al. | 370/432 |
| 8,275,508 B1* | 9/2012 | Adams et al. | 701/29.3 |
| 2002/0184236 A1* | 12/2002 | Donath et al. | 707/104.1 |
| 2006/0106514 A1* | 5/2006 | Liebl et al. | 701/35 |
| 2006/0139454 A1* | 6/2006 | Trapani | 348/148 |
| 2006/0211413 A1* | 9/2006 | Ariyur et al. | 455/423 |
| 2007/0087756 A1* | 4/2007 | Hoffberg | 455/450 |
| 2008/0147266 A1* | 6/2008 | Plante et al. | 701/35 |
| 2008/0154499 A1* | 6/2008 | Tanaka | 701/211 |
| 2009/0128363 A1* | 5/2009 | Wagenhuber et al. | 340/902 |
| 2010/0073195 A1* | 3/2010 | Rothschild | 340/905 |
| 2010/0076670 A1* | 3/2010 | Turner et al. | 701/117 |
| 2012/0059821 A1* | 3/2012 | Li et al. | 707/728 |
| 2012/0197875 A1* | 8/2012 | Bai et al. | 707/723 |

OTHER PUBLICATIONS

Pavle Belanovi' et al. "On Wireless Links for Vehicle-to-InfrastructureCommunications", IEEE Transactions on Vehicular Technology,2009 IEEE., pp. 1-14.*

Ying Cai et al. "Real-Time Processing of Range-Monitoring Queries in Heterogeneous Mobile Databases", IEEE Transactions on Mobile Computing, vol. 5, No. 7, Jul. 2006, pp. 931-942.*

\* cited by examiner

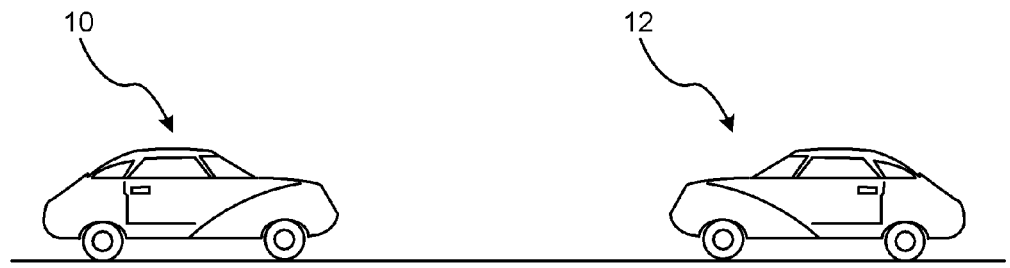
Fig. 1
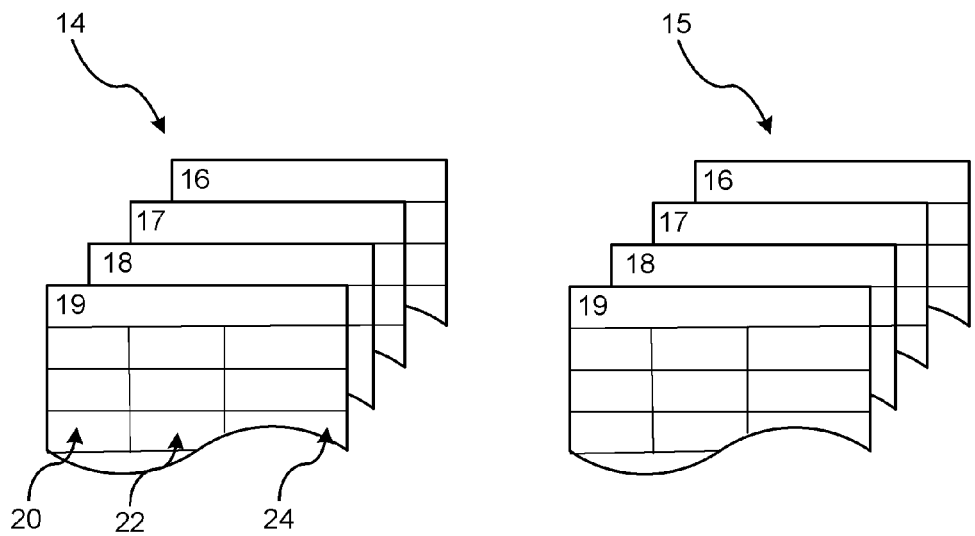
Fig. 2
$$(|A \cap B|A) = \frac{|N_A \cap N_B|}{|N_A|} \approx \frac{|S_A \cap S_B|}{|S_A|} = \frac{2}{3}$$
$|S_A| = 3$
| 1 | 0 | 0 | 1 | 0 | 1 | 0 | 0 | 1 | 0 | 1 | 0 |
$|S_A| = 4$
$$(|A \cap B|A) = \frac{|N_A \cap N_B|}{|N_B|} \approx \frac{|S_A \cap S_B|}{|S_b|} = \frac{2}{4}$$
Fig. 4

EFFICIENT INFORMATION EXCHANGE BETWEEN ENCOUNTERING VEHICLES USING APPROXIMATE KNOWLEDGE VIA HASH FUNCTIONS

BACKGROUND OF INVENTION

An embodiment relates generally to vehicle-to-vehicle communication.

Vehicle-to-vehicle (V2V) communications relate to cooperative vehicular communication systems that are based on two-way communications for interacting in real time. Such systems have typically been directed at traffic management, collision warning, and collision avoidance systems. Such systems can extend a host vehicle's range of awareness of environmental conditions by providing relevant information regarding the status of traffic in addition to any safety related events occurring in proximity to those neighboring vehicles of the host vehicle.

With the evolution of the V2V communications, transfer of non-safety related data may be a desirable feature. For example, vehicles can obtain information related to places or services other vehicles have visited. Other examples include peer-to-peer music sharing among vehicles, diagnostic and prognostic information comparison among vehicles, or other non-safety infotainment information which is valuable to customers. A remote vehicle desiring to utilize stored information of another vehicle can possibly request such information from the other vehicle. In V2V communications systems, an issue with wirelessly communicating stored information relates to the size of data packet that is transmitted, in addition to determining what information is relevant to the requesting vehicle. Transferring large quantities of information may result in overburdening the bandwidth of the wireless communication channel. Information transferred may also be duplicate information that the requesting vehicle already has stored in its memory. Moreover, the time that two vehicles are in communication with one another may be of a short duration at best, and if large amounts of data are transferred, then the non-overlapping portion of the data may either not be transferred or may not be transferred in its entirety.

SUMMARY OF INVENTION

An advantage of an embodiment is an efficient transfer of information between two communicating vehicles in a V2V system where a determination is made as to whether information stored in a memory of the vehicle is redundant with the respect to the other vehicle. A query request is transmitted from a first vehicle to a second vehicle containing specifics as to what information the first vehicle is seeking. Data satisfying the query request represented by record indexes is hashed to determine the similarity between the data of the two communicating vehicles. Thereafter, the second vehicle wirelessly transmits to the first vehicle the non-overlapping data that satisfies the query request.

An embodiment contemplates a method of exchanging records in a vehicle-to-vehicle communication system. The records relate to places of interest to a user of a vehicle that are stored within a vehicle-based database. Each respective record identifying at least a name of the place and other attributes relating to the place are capable of being queried from the database. A respective place in a respective record is identified by a global unique index number. A specific global unique index number relating to a specific place is common among all vehicles within the vehicle-to-vehicle communication system. A first vehicle and a second vehicle detects that they are within a predetermined proximity of one another. A query is communicated from the first vehicle to the second vehicle relating to a desired scope of information contained within the records of the second vehicle. The query further includes the number of records in a database of the first vehicle that satisfies the query as well an abstraction of the records in the database that satisfies the query conditions. The second vehicle determines a number of records within a database of the second vehicle that satisfies the query. The second vehicle determines if the number of records in the first vehicle that satisfy the query and the number of records in the second vehicle that satisfy the query are within a predetermined range. The second vehicle estimates a similarity between the records of the first vehicle and the second vehicle that satisfy the query when the number of records of the first vehicle and the second vehicle satisfying the query are within the predetermined range. Estimating the similarity comprises the following steps. The first vehicle randomly selects a first subset of the records that satisfy the query from the database of the first vehicle. The first vehicle identifies each global unique index number associated with each record in the first subset. The second vehicle randomly selects a second subset of records that satisfy the query from the database of the second vehicle. The second vehicle identifies each global unique index number associated with each record in the second subset. The identified global unique index numbers of the first and second subsets are hashed into a same bit vector. A similarity is calculated as a function of the hashed global unique index numbers of the first vehicle and the second vehicle. The second vehicle requests all of the global unique index numbers associated with the records from the first vehicle that satisfy the query in response to the similarity being greater than a predetermined threshold. Otherwise, the second vehicle requests a compressed number of global unique index numbers associated with the records from the first vehicle that satisfy the query.

BRIEF DESCRIPTION OF DRAWINGS

FIG. 1 is a traffic flow diagram illustrating two vehicles in communication with one another in a V2V communication system.

FIG. 2 is examples of records maintained by vehicles within its vehicle memory.

FIG. 4 is an exemplary hash operation illustrating how to determine a similarity of records between two vehicles.

DETAILED DESCRIPTION

Figure 3:
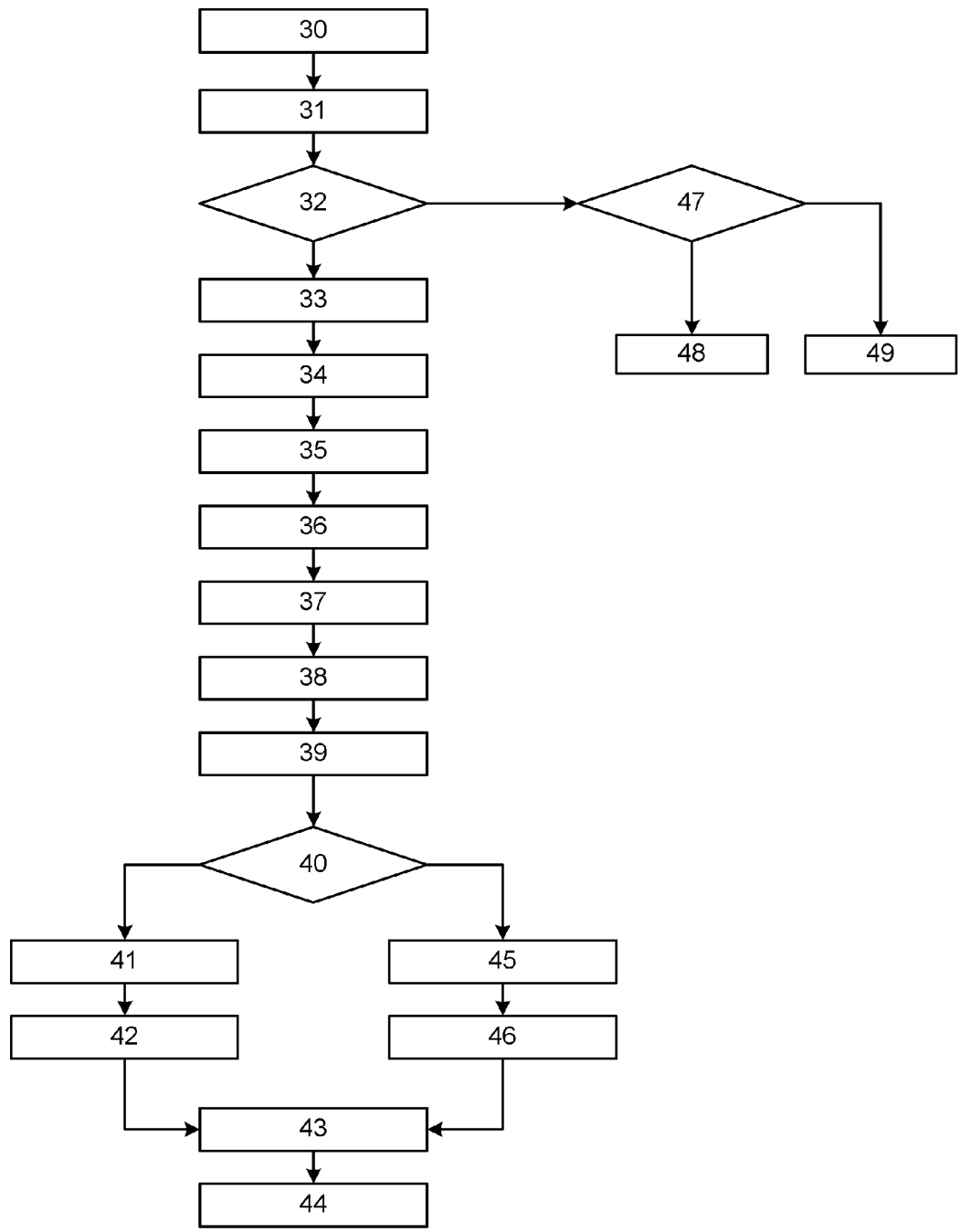
FIG. 3 is a flowchart of a method for querying and exchanging queried information in the V2V communication system

There is shown generally in FIG. 1 a traffic flow diagram illustrating a first vehicle 10 and a second vehicle 12. The second vehicle 12 has communication capabilities with the first vehicle 10 known as vehicle-to-vehicle (V2V) communications. The first vehicle 10 and the second vehicle 12 send wireless messages to one another over a respective inter-vehicle communication network (e.g., DSRC) for exchanging data. Each vehicle collects data relating to specific places or services visited. The places or services are organized and stored as records.

FIG. 2 illustrates examples of such records maintained by a vehicle within the communication system. A first set of categorized records 14 and a second set of categorized records 15 are shown in FIG. 2. Each vehicle organizes the existing records of data according to different interest categories. Each category may be an independent table containing a respective number of records. The categories may be grouped by a respective type of service visited by the user of the vehicle. Each category includes a plurality of records. Each record may include information relating to place or service. Such information includes but is not limited to various scopes of interest that include, but are not limited to, user interest scope, spatial scope, temporal scope, pricing scope, and a rating scope.

The user interest scope relates to a type of service that has been used (e.g., gas station, restaurant). Temporal scope relates to a time when the information was last updated (e.g., less than 1 day). Spatial scope relates to a distance (e.g., distance within a 5 mile radius). Pricing scope relates to a price for a product or service (e.g., gas less than $3.00/gallon), and rating scope relates to either the user rating or commercially known rating for the service (e.g., restaurant rating>4 stars).

The respective first set of categorized records 14 may be categorized by the city or other geographical description (e.g., zip code, district name) for which the place or service resides. Each of the respective categories 16, 17, 18, and 19 may represent the type of service. For example, 16 may refer to shopping locations, 17 may refer to grocery locations, 18 may refer to restaurant locations, and 19 may refer to gas station locations. Each of the slots in the first column 20 refers to the name of the place or service. For example, if the category is gas stations, the names in first column 20 may refer to specific gas stations (e.g., Shell #102, BP #34, etc.). Similarly, the second column 22 may refer to a respective address for that respective service station, and the third column 24 may refer to a last time the information describing the service was updated. The second set of categorized records 18 contains similar groupings of data for a different city. It should be understood that the categories referenced herein are exemplary and the different schemes may be utilized for categorizing the information. It should also be understood that it is not the intention of this invention as to how the information is categorized or whether the information is categorized. The examples shown in FIG. 2 are examples of one way in which information may be categorized so that the records may be queried from a database. As shown in the exemplary database shown in FIG. 2, each respective row that designates a place or service and various attributes associated with the place or service is referred to as a record. Each specific location will have a global index number that is unique to the place or service. The global unique index number is an identifier that is common among all vehicles within the V2V system. That is, for a specific place or service, a specific unique index number is designated for that specific place or service that may be commonly referenced by all vehicles within the V2V system. Therefore, when a global unique index number is referenced, each vehicle in the V2V system will associate the specific place or service with that global unique index number. The global unique index number may be numbers, letters, or alphanumeric characters. Alternatively, global unique index number may be derived using an existing number or combination of numbers/characters/attributes (e.g., Fed tax ID, credit card merchant ID, phone number).

Due to the overwhelming amount of information that is stored in a vehicle, transmitting records in their entirety wirelessly to another vehicle may be cumbersome due to the amount of data and file size transmitted over the communication channel. Therefore, it is advantageous not to send overlapping information. Overlapping information is information that both vehicles concurrently possess in their memory. As a result, a vehicle effectively communicates only those records that meet the query requirements. In addition, the embodiments described herein provide a technique for determining which records to transmit without initially sending the full text of the records.

FIG. 3 illustrates a flowchart of a method for exchanging non-overlapping records in a V2V communication system. In step 30, a query is transmitted from the first vehicle to the second vehicle. The query specifies the scope of information that the first vehicle is interested in obtaining from the second vehicle. The scope may relate to the following parameters that include, but are not limited to, a user interest scope, temporal scope, spatial scope, pricing scope, and rating scope. As described earlier, it is not the intention of this invention to determine how the information is mined from the vehicle database when queried as any type of database management system may be used.

The user of the vehicle can explicitly specify the interest scope, or the vehicle can automatically set user interests depending on the state of the vehicle. For example, if the vehicle is below a predetermined gas level or if the vehicle has been driving non-stop for a predetermined number of hours, the system may automatically transmit a message that queries for gas stations within a spatial scope. In addition to transmitting the query, the number of records maintained by the first vehicle that satisfies the query is also transmitted to the second vehicle in the message.

In step 31, the second vehicle receives the message that includes the query request from the first vehicle. The message also includes the number of records maintained by the first vehicle that satisfies the query. The second vehicle determines the number of records that is maintained in its database that satisfies the query. The number of records as determined by the second vehicle that satisfies the query is compared to the number with of records of the first vehicle that satisfy the query.

In step 32, a determination is made whether the number of records of the first vehicle and the second vehicle that satisfy the query are within a predetermined range of one another. If the determination is that the number of records between the first and second vehicle are within the predetermined range, then the routine proceeds to step 33.

In step 33, the first vehicle identifies a first subset of records of the first vehicle that satisfy the query and the second vehicle identifies a second subset of records of the second vehicle that satisfy the query. The first subset and second subset of records are randomly selected from their respective databases based on a same percentage. That is, a same percentage is used to select the records within each database. The percentage may be a value that is previously set or may be a value that is adaptively determined. If the value is adaptively determined, the percentage must be a mutually identified value between both vehicles.

In step 34, the first vehicle randomly selects a percentage of records (i.e., first subset) that satisfy the query from the database of the first vehicle. This first subset is represented by $S_A$.

In step 35, each randomly selected record from the database of the first vehicle is identified by its associated global unique index number.

In step 36, the second vehicle randomly selects a percentage (i.e., second subset) of records that satisfy the query from the database of the second vehicle. The second subset is represented by $S_B$.

In step 37, each randomly selected record from the database of the second vehicle is identified by its associated global unique index number.

In step 38, the identified global unique index numbers in the first subset and the second subset are hashed into a same hash function of a same bit vector length. By comparing the number of common bits which are "1" rather than "0", it is easy to derive the overlapping portion of information between the first vehicle and the second vehicle. FIG. 4 illustrates the hashing of the global unique index numbers associated with the records from the first subset and the second subset. FIG. 4 illustrates an exemplary bit vector of bit length m=12. Hashing is a well-defined mathematical process that converts a large variably sized amount of data into scaled down datum. Typically a single integer serves as an index to the array. The hashing process serves to speed up a lookup process and data comparison tasks. Herein, the hashing process is used to find duplicate records within the array. FIG. 4 illustrates the hash function for the subsets $S_A$ and $S_B$. In this example, let the number of records that satisfy the query in the first vehicle be $N_A=30$, the number of records that satisfy the query in the second vehicle be $N_B=40$, and the mutually agreed predetermined percentage be $\alpha=10\%$. As a result, the number of randomly selected records from the database of the first vehicle and second vehicle that satisfies the query $S_A=3$ and $S_B=4$, respectively. The global unique index numbers associated with the randomly selected records are hashed into the same bit vector of the array to determine the overlapping portion between these two vehicles.

The hash function as utilized herein is a mutually agreed upon hash function between the first vehicle and the second vehicle. It should be understood that to perform hashing, different techniques may be used. For example, the first vehicle transmits the identified global unique index numbers of the first subset to the second vehicle. The second vehicle second vehicle then hashes each global unique index number of the second subset and the transmitted global unique index numbers transmitted of the first subset into a same bit vector. The similarity is then determined based on the hashing of the respective global unique index numbers. In another example, the first vehicle hashes each global unique index number of the first subset into the mutually identified hash function. The second vehicle hashes each global unique index number of the second subset into the mutually identified hash function. Thereafter, one of the vehicles transmits the hash results to the other vehicle so that a similarity may be determined.

In step, 39, a similarity is determined utilizing the results from hashing the global unique index numbers for both vehicles. The following equation is used to determine similarity. If the second vehicle is determining the similarity, then the equation is represented as follows:

$$\text{Similarity}(A \cap B \mid B) = \frac{|N_A \cap N_B|}{|N_B|} \approx \frac{|S_A \cap B_B|}{|S_B|}. \tag{4}$$

It should be understood that the similarity as determined by the sample sets is equivalent to a similarity as determined utilizing the number of records. In FIG. 4, if a global unique index number is present in the bit vector, it is designated by a "1"; otherwise a "0" is designated. As shown in FIG. 4, there are two bits within the bit vector that are both common to $S_A$ and $S_B$. As a result, the similarity is 2/4. It is noted that in the above equation, the value utilized in the denominator is that of the number of the randomly selected records of the vehicle that is performing the similarity calculation. Herein, the second vehicle $S_B$ is determining the similarity, so the number of randomly selected records of the second vehicle $S_B=4$ is utilized in the denominator. If the first vehicle is determining the similarity, then the equation for determining the similarity is represented as follows:

$$\text{Similarity}(A \cap B \mid A) = \frac{|N_A \cap N_B|}{|N_A|} \approx \frac{|S_A \cap B_B|}{|S_A|}. \tag{5}$$

The similarity as determined by the first vehicle utilizing eq. (5) is 2/3. It should be understood that the commonality of bits within the bit vector (e.g., numerator) will be the same whether the first vehicle determines the similarity or the second vehicle determines the similarity. It is also noted that the similarity determined utilizing the randomly selected records is equivalent to a similarity determined utilizing the actual number of records.

In step 40, a determination is made whether the similarity is greater than a predetermined threshold. If the determination is that the similarity is greater than the predetermined threshold, then severe overlapping is present and the routine proceeds to step 41.

In step 41, the second vehicle requests all of the global unique index numbers associated with the records from the first vehicle that satisfy the query.

In step 42, the first vehicle receives the request and transmits the requested index numbers to the second vehicle.

In step 43, the second vehicle determines which records stored in its database should be transmitted to the first vehicle as a function of the global unique index numbers received from the first vehicle and the global unique index numbers associated with the records of the second vehicle's database that satisfy the query. The determination is based on the equation represented by the following formula:

$$N_B - |NR_A \cap N_B|$$

where $N_B$ is all of the global unique index numbers associated with records of the second vehicle that satisfy the query, and $NR_A$ is the global unique index numbers associated with the records from the first vehicle requested by the second vehicle. A comparison is made using a logical "AND" operation to determine the global unique index numbers that is common between the first vehicle and the second vehicle. As described earlier, a similarity being greater than the predetermined threshold indicates that there is a large amount of overlapping data. Therefore, it is expected that the number of global unique index numbers that are common between the first vehicle and the second vehicle will be large. The resulting output is compared to the global unique index numbers of the second vehicle $N_B$ to determine which indexes that the first vehicle does not have in comparison to the second vehicle. The difference represents the respective records that that are not in the database of the first vehicle.

In step 44, the second vehicle transmits to the first vehicle the full record set (e.g. entire record set that includes the full text) that the first vehicle does not have in its database as determined in step 43.

Referring again to step 40, if the determination is made that the similarity is less than the predetermined threshold, then a lesser amount of overlapping data is present which does not require a full set of record indexes sent from the first vehicle to the second vehicle. As a result, the routine proceeds to step 45.

In step 45, the second vehicle requests a compressed portion of the global unique index numbers from the first vehicle. In a preferred embodiment, a bloom filter is used to select the global index numbers. A bloom filter is a space-efficient probabilistic data structure that is used to test whether an element is a member of a respective set. False negatives are not possible when utilizing a bloom filter; however, false positive results are possible when utilizing a bloom filter, but the bloom filter can significantly reduce the size of an index file (e.g., 8000 records≈5 kB, with <1% false positives).

A bloom filter starts with a bit array of m bits, all set to 0. A number of k different hash functions are defined, whereas each hash function hashes a respective hash element to one of the m array positions with a uniform distribution. Elements are added to the bit array. That is, each element is fed to each of the k array positions. The bits at these positions are set to 1. To determine whether an element is within the set, each element is fed to each of the k hash functions to get k array positions. If all the bits are 1, then the element is in the set. If any of the bits at these positions are 0, then the element is not in the set.

The probability for getting a false positive from the bloom filter is represented by the following formula:

$$P_{false\ postives} = \left(1 - \left(1 - \frac{1}{m}\right)^{kn}\right)^k \approx (1 - e^{-kn/m})^k \quad (2)$$

where P is the false positive error probability, m is the number of bits in the array, n is the number of inserted elements, and k is the number of hash functions. To maintain the false positive error probability less than a respective value, the length of the bit array in is optimized as follows:

$$m = -\frac{n \log_e p_d}{(\log_e 2)^2} \quad (3)$$

where n is the number of inserted elements, and $p_d$ is a desired false positive probability.

Therefore, by specifying the desired false positive probability $p_d$, the length of bit array m is calculated. The false positive probability P could be further optimized as a joint function of a content similarity between the first vehicle and the second vehicle, and an expected encounter time of duration between the first vehicle and the second vehicle.

After the global unique index numbers are processed from the bloom filter, the routine proceeds to step 46.

In step 46, the first vehicle receives the request from the second vehicle identifying the compressed unique index numbers and transmits the global unique index numbers as determined in step 45. The routine proceeds to step 43.

In step 43, the second vehicle determines which records to send to the first vehicle utilizing the formula shown in eq. (1). Herein, the global unique index numbers $NR_A$ is the compressed global unique index numbers as determined by a bloom filtering technique.

In step 44, the second vehicle transmits to the second vehicle the records as determined in step 43.

Referring again to step 32, if the determination is made that the number of records of the first vehicle and the second vehicle that satisfy the query are not within the predetermined range, the routine proceeds to step 47.

In step 47, a determination is made whether the number of records of the first vehicle is greater than or less than the number of records of the second vehicle by a predetermined number. The predetermined number preferably represents a value that illustrates a significant disparity (e.g., on the order of magnitudes) when comparing the number of records between the first vehicle and the second vehicle. The predetermined number may be determined through experimentation or theoretical analysis. If the determination is made that the number of records of the first vehicle is greater than the number of records of the second vehicle by the predetermined number, then the routine proceeds to step 48.

In step 48, the second vehicle sends no records to the first vehicle.

If the determination in step 47 is made that the number of records of the first vehicle is less than the number of records of the second vehicle by the predetermined number, then the routine proceeds to step 49. The predetermined number, as described above, is a value that illustrates a significant disparity (e.g., on the order of magnitudes) between the number of records of the first vehicle and the number of records of the second vehicle satisfying the query.

In step 49, the second vehicle sends all of the records of the second vehicle that satisfy the query to the first vehicle.

While certain embodiments of the present invention have been described in detail, those familiar with the art to which this invention relates will recognize various alternative designs and embodiments for practicing the invention as defined by the following claims.

What is claimed is:

1. A method of exchanging records in a vehicle-to-vehicle communication system, the records relating to places of interest to a user of a vehicle that are stored within a vehicle-based database, each respective record identifying at least a name of the place and other attributes relating to the place that are capable of being queried from the database, wherein a respective place in a respective record is identified by a global unique index number, wherein a specific global unique index number relating to a specific place is common among all vehicles within the vehicle-to-vehicle communication system, the method comprising the steps of:

a first vehicle and a second vehicle detecting that they are within a predetermined proximity of one another;

communicating a query from the first vehicle to the second vehicle relating to a desired scope of information contained within the records of the second vehicle, the query further including a number of records in a database of the first vehicle that satisfies the query;

the second vehicle determining a number of records within a database of the second vehicle that satisfies the query;

the second vehicle determining if the number of records in the first vehicle that satisfy the query and the number of records in the second vehicle that satisfy the query are within a predetermined range;

the second vehicle estimating a similarity between the records of the first vehicle and the second vehicle that satisfy the query when the number of records of the first vehicle and the second vehicle satisfying the query are within the predetermined range, wherein estimating the similarity comprises the steps of:

the first vehicle randomly selecting a first subset of the records satisfying the query from the database of the first vehicle;

the first vehicle identifying each global unique index number associated with each record in the first subset;

the second vehicle randomly selecting a second subset of records satisfying the query from the database of the second vehicle;

the second vehicle identifying each global unique index number associated with each record in the second subset;

hashing the identified global unique index numbers of the first and second subsets using a same hash function; and calculating a similarity as a function of the hashed global unique index numbers of the first vehicle and the second vehicle;

the second vehicle requesting all of the global unique index numbers associated with the records from the first vehicle that satisfy the query in response to the similarity being greater than a predetermined threshold, otherwise, the second vehicle requesting a compressed number of global unique index numbers associated with the records from the first vehicle that satisfy the query.

2. The method of claim 1 wherein estimating a similarity between the records of the first vehicle and the second vehicle that satisfy the query is represented by the following formula:

$$\text{Similarity}\,(A \cap B \,|\, A) \approx \frac{|S_A \cap S_B|}{|S_A|}$$

where $S_A$ is the randomly selected global unique index numbers associated with the records of the first subset, and $S_B$ is randomly selected global unique index numbers associated with the records of the second subset.

3. The method of claim 1 wherein the similarity is determined as a function of the entire global unique index numbers associated with records of the first vehicle and the second vehicle that satisfy the query, according to the following equation:

$$\text{Similarity}\,(A \cap B \,|\, A) = \frac{|N_A \cap N_B|}{|N_A|} \approx \frac{|S_A \cap S_B|}{|S_A|}$$

where $N_A$ is all of the global unique index numbers associated with records of the first vehicle that satisfy the query, $S_A$ is the randomly selected global unique index numbers associated with the records of the first subset, $N_B$ is all of the global unique index numbers associated with records of the second vehicle that satisfy the query, and $S_B$ is randomly selected global unique index numbers associated with the records of the second subset.

4. The method of claim 1 further comprising the steps of:
the first vehicle transmitting to the second vehicle the global unique index numbers associated with the records from the first vehicle as requested by the second vehicle;
the second vehicle determining which respective records stored in the database of the second vehicle to transmit to the first vehicle as a function of the global unique index numbers transmitted from the first vehicle to the second vehicle and a function of the global index numbers associated with the records stored in the database of the second vehicle that satisfies the query; and
transmitting the respective records to the first vehicle.

5. The method of claim 4 wherein the determination of which respective records to transmit from the second vehicle to the first vehicle is represented by the following formula:

$$N_B - |NR_A \cap N_B|$$

where $N_B$ is the global unique index numbers associated with records of the second vehicle that satisfy the query, and $NR_A$ is the global unique index numbers associated with the records from the first vehicle requested by the second vehicle.

6. The method of claim 5 wherein the global unique index numbers $NR_A$ are determined using a bloom filter.

7. The method of claim 5 wherein the global unique index numbers $NR_A$ are all of the index numbers associated with the records of the first vehicle that satisfy the query.

8. The method of claim 1 further comprising the steps of sending no records from the second vehicle to the first vehicle in response to the number of records in the first vehicle and the number of records in the second vehicle being outside of the predetermined range, wherein the number of records of the first vehicle that satisfy the query is greater than the number of records of the second vehicle that satisfy the query by a first predetermined number.

9. The method of claim 1 further comprising the steps of the second vehicle sending all of the records in the database of the second vehicle that satisfy the query to the first vehicle in response to the number of records in the first vehicle and the number of records in the second vehicle being outside of the predetermined range, wherein the number of records of the first vehicle that satisfy the query is less than the number of records of the second vehicle that satisfy the query by a first predetermined number.

10. The method of claim 1 wherein the hashing the identified global unique index numbers of the first vehicle and the identified global unique index numbers of the second vehicle into a same bit vector further comprises the steps of:
the first vehicle and second vehicle mutually identifying a hash function;
the first vehicle hashing each global unique index number associated with each record of the first subset into the identified hash function;
the second vehicle hashing each global unique index number associated with each record of the second subset into the identified hash function; and
the first vehicle communicating hash results as determined by the first vehicle to the second vehicle.

11. The method of claim 1 wherein the hashing the identified global unique index numbers of the first vehicle and the identified global unique index numbers of the second vehicle into a same bit vector further comprises the steps of:
the first vehicle transmitting the identified global unique index numbers associated with each record of the first subset to the second vehicle; and
the second vehicle hashing each global unique index number associated with each record of the second subset and the identified global unique index numbers transmitted by the first vehicle into the same bit vector.

12. The method of claim 1 wherein the first subset of the records and the second set of records randomly selected from the respective databases are selected based on randomly selecting a same percentage from each respective database.

13. The method of claim 12 wherein the percentage is a predetermined percentage.

14. The method of claim 12 wherein the percentage is adaptively determined.

15. The method of claim 1 wherein the queried information includes information relating to a group that includes at least a description of the place.

16. The method of claim 1 wherein the queried information includes information relating to a group that includes at least one of a temporal scope, a spatial scope, a user interest scope.

17. The method of claim 1 wherein the queried information relates to pricing information.

18. The method of claim 1 wherein the queried information relates to rating information.

19. The method of claim 1 wherein the predetermined threshold is a calibrated threshold.

20. The method of claim 1 wherein the predetermined threshold is an adaptive threshold.

* * * * *